United States Patent [19]
Moissev et al.

[11] Patent Number: 5,945,980
[45] Date of Patent: Aug. 31, 1999

[54] TOUCHPAD WITH ACTIVE PLANE FOR PEN DETECTION

[75] Inventors: Vitali D. Moissev; Vitali P. Sumenkov; Andrev A. Tareev; Aleksey A. Tareev, all of Ulyanovsk, Russian Federation; Roland Singer, Stuttgart, Germany

[73] Assignee: Logitech, Inc., Fremont, Calif.

[21] Appl. No.: 08/970,947

[22] Filed: Nov. 14, 1997

[51] Int. Cl.⁶ .................................................. G09G 5/00
[52] U.S. Cl. ...................... 345/173; 345/157; 178/18.01; 178/19.04; 178/19.07
[58] Field of Search .................................. 345/156, 157, 345/173–177; 178/19.01, 19.02, 19.06, 19.07, 20.04, 18.01, 18.02, 18.03, 18.04

[56] References Cited

U.S. PATENT DOCUMENTS

| | | | |
|---|---|---|---|
| 4,550,221 | 10/1985 | Mabusth ..................................... | 178/18 |
| 4,758,830 | 7/1988 | Levien et al. ............................. | 345/174 |
| 5,305,017 | 4/1994 | Gerpheide ................................. | 345/174 |
| 5,365,461 | 11/1994 | Stein et al. ................................ | 364/550 |
| 5,451,723 | 9/1995 | Huang et al. .............................. | 178/18 |
| 5,543,589 | 8/1996 | Buchana et al. ........................... | 178/18 |
| 5,565,658 | 10/1996 | Gerpheide et al. ........................ | 178/19 |
| 5,686,705 | 11/1997 | Conroy et al. ............................. | 178/19 |
| 5,777,607 | 7/1998 | Koolen ..................................... | 345/174 |
| 5,790,106 | 8/1998 | Hirano et al. ............................. | 345/173 |

*Primary Examiner*—Dennis-Doon Chow
*Assistant Examiner*—Amr Awad
*Attorney, Agent, or Firm*—Townsend and Townsend and Crew LLP

[57] ABSTRACT

A touchpad which simulates an active stylus by providing pulses to the entire active plane (making it an active plane), instead of the stylus. This allows a simple, non-active stylus to compress the touchpad to bring the X, Y traces closer to the active plane at the point to be detected. The phase of the pulses applied to the active ground could be chosen to make a stylus look like a finger, or to differentiate it. The pulses are applied synchronously with the standard triangular waveform applied to traces in the trace matrix. The other traces not being sampled at a particular time are truly grounded, and thus are separated from the active plane.

25 Claims, 5 Drawing Sheets

TOUCHPAD WITH ACTIVE PLANE FOR PEN DETECTION

BACKGROUND OF THE INVENTION

The present invention relates generally to touchpad devices, and more particularly to capacitive sensing touchpad devices.

A wide variety of touchpad or touch sensing devices have been developed. Resistive membrane position sensors have been used for some time. Such touchpads have been used as keyboards, position indicators, etc. Other types of touch sensing devices include resistive tablets, surface acoustic wave devices, touch sensors based on strain gauges or pressure sensors, and optical sensors.

Capacitive touchpads are often used to detect a finger. A typical capacitive touchpad will have a matrix of row and column traces separated by an insulating or dielectric layer from a ground plane. When a finger is brought into proximity with the matrix, the finger acts as a conductor which intercepts the electromagnetic radiation when the individual traces are driven. Thus, it will capacitively couple, changing either the capacitance between the matrix and ground, or the transcapacitance between row and column electrodes. This variation in capacitance can be measured as a change in voltage. By sequentially driving a current to all of the traces in rapid succession, and measuring the resulting voltages on them, the location of the finger can be determined.

Typically, a different system has to be used for a stylus. A stylus may be of a plastic or other material which is non-conductive, and thus will not provide the same capacitive effect as a finger. One method used is to simulate a finger by providing an active stylus, which has an electrical circuit in it for generating signals which will interact with the traces, and produce a similar effect to that of a finger.

It would be desirable to have a single touchpad technology which can detect both a finger and an inactive stylus.

SUMMARY OF THE INVENTION

The present invention provides a touchpad which simulates an active stylus by providing pulses to an entire active plane (normally a ground plane), instead of the stylus. This allows a simple, non-active stylus to compress the touchpad to bring the X, Y traces closer to the active plane at the point to be detected. The phase of the pulses applied to the active ground could be chosen to make a stylus look like a finger, or to differentiate it. The pulses are applied synchronously with the standard triangular waveform applied to traces in the trace matrix. The other traces not being sampled at a particular time are truly grounded, and thus are separated from the active plane.

The size and timing of the active plane pulses (relative to the waveform of the traces) can be varied to vary sensitivity, and to ensure that the amplitude of signals resulting from use of a stylus is in the same range as signals resulting from use of a finger. The present invention thus allows the same touchpad to sense both a finger and a stylus with the same circuitry. A separate, truly grounded shield layer can be placed between the active plane and the electrical components. The active plane can be a continuous sheet, or an array in which all the traces are activated at the same time. The active plane can either be positioned below the matrix of traces, or above it.

In one embodiment, the invention can distinguish between a finger and a stylus. First, detection is used with the active plane. Immediately subsequent, in a very short period of time, the traces are also activated with the active plane grounded (or other variations of amplitude, such as a DC voltage other than zero or ground, or phase could be used). If a finger is present, it will capacitively couple in the normal manner during the second step, when the active plane is grounded. If it is a stylus detected in the first step, it will not be detected in the second step, enabling a distinction between a finger and a stylus.

For a further understanding of the nature and advantages of the invention, reference should be made to the following description taken in conjunction with the accompanying drawings.

DETAILED DESCRIPTION OF THE INVENTION

Figure 1:
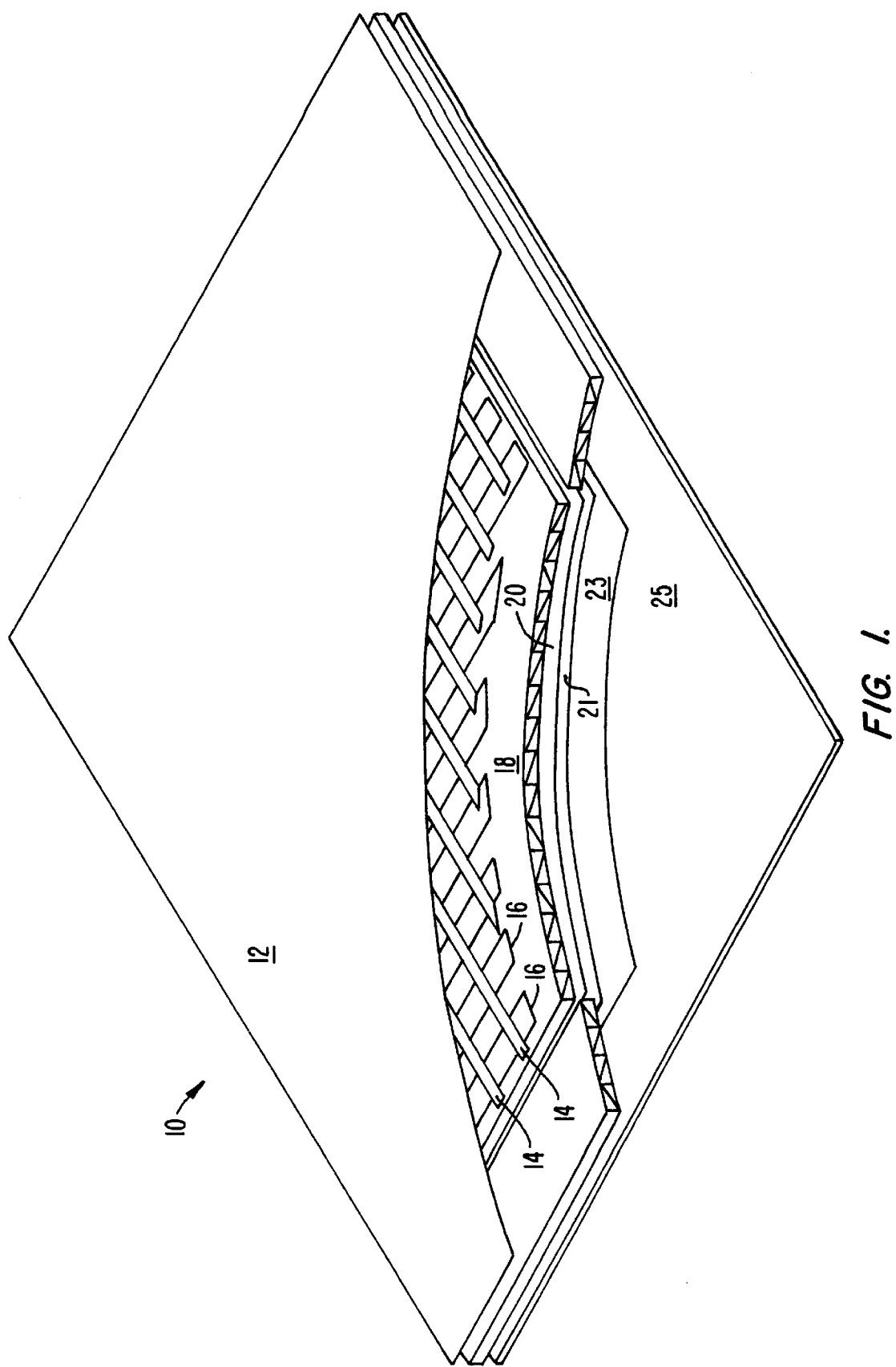
FIG. 1 is a perspective, cut-away view of a touchpad according to the present invention.

FIG. 1 illustrates a touchpad 10 according to the invention. A top, insulating layer 12 is provided for being touched by the user. Below layer 12 is an array of X traces 14 over an array of Y traces 16. Typically, an insulating layer will be provided between the X and Y traces, not shown in this view.

Next, an insulating, compressible layer 18 is provided. Compressible layer 18 may be silicone or some other flexible material, such as a foam or flexible laminate. Beneath compressible layer 18 is the active plane 20, typically a copper sheet. X and Y traces 14, 16 are also preferably made of copper.

A further insulating layer 21 is provided over a shield 23 which is actually grounded to shield the touchpad from any electrical components on an underlying printed circuit board (PCB) 25. Layer 21 can be much thinner and need not be compressible like layer 18.

In an alternate embodiment, the locations of the X, Y array 14, 16 and active plane 20 (also called a conducting plane herein) could be reversed.

Figure 2:
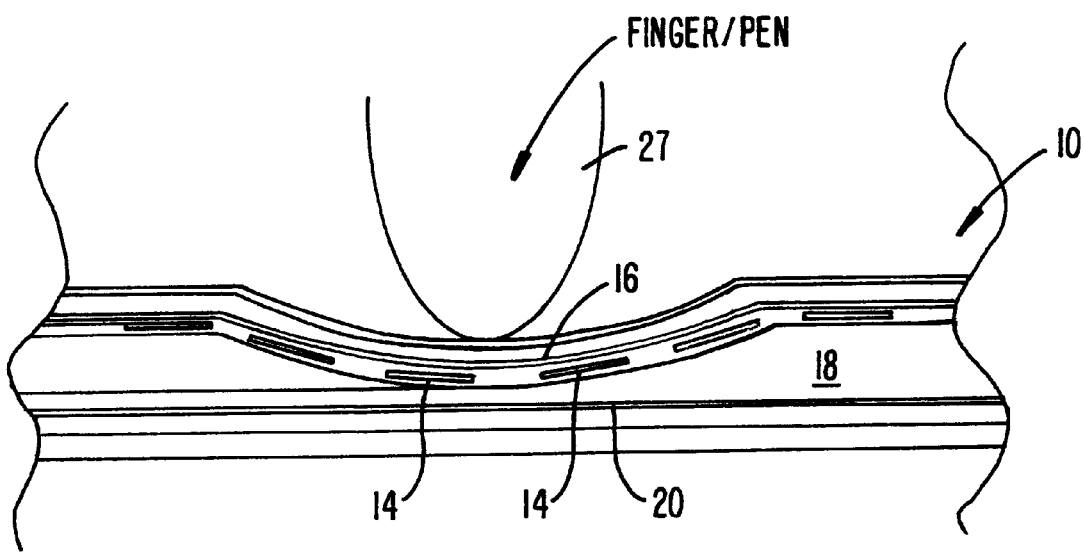
FIG. 2 is a side view of the touchpad of FIG. 1 illustrating the depression due to a finger.

FIG. 2 illustrates a finger or pen 27 in contact with touchpad 10 of FIG. 1. As can be seen, compressible layer 18 is compressed in the area underneath the finger, bringing X traces 14 and Y trace 16 closer to active plane 20.

Figure 3:
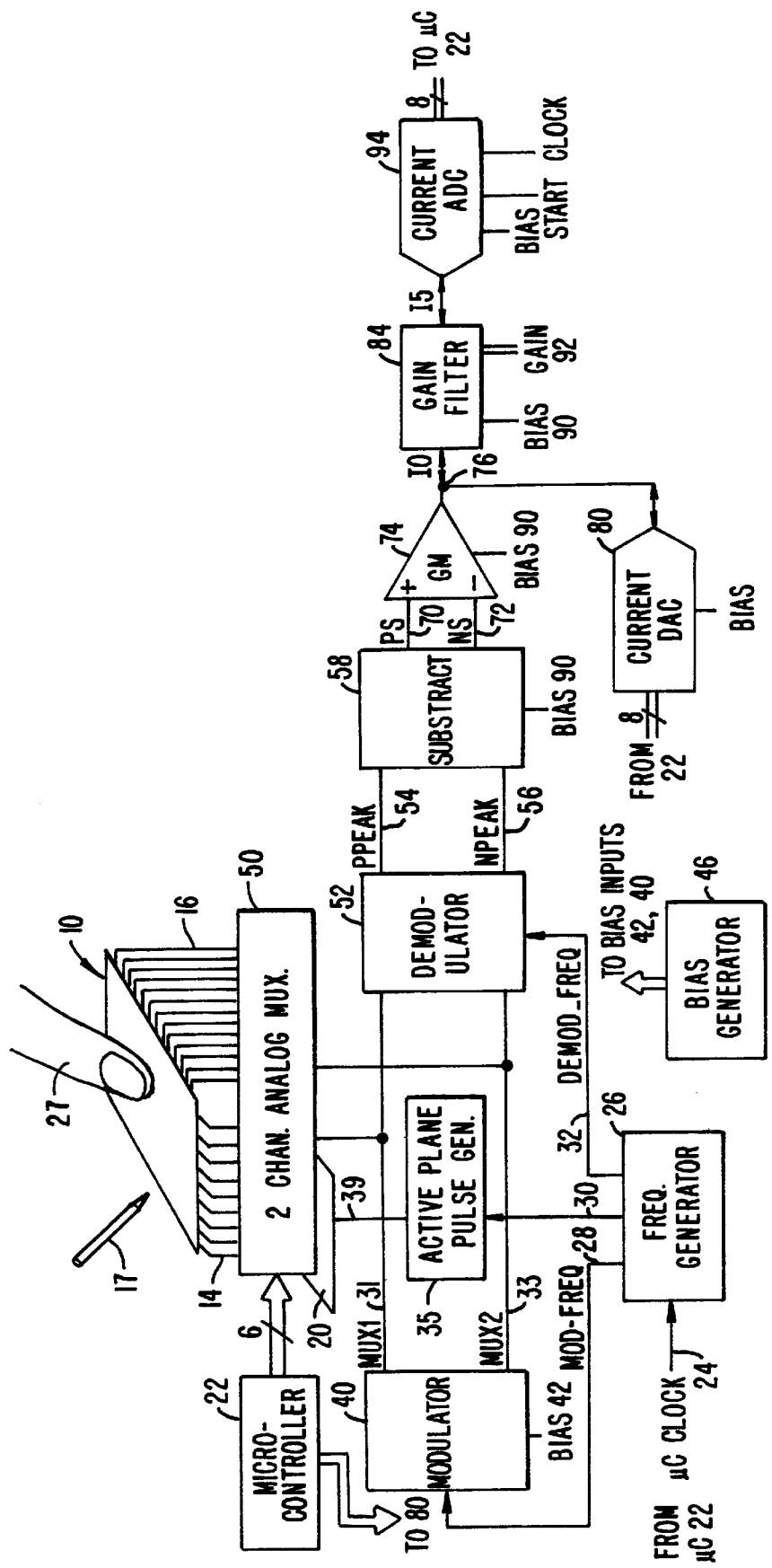
FIG. 3 is a block diagram of the electronic circuitry for the touchpad of FIG. 1.
Figure 4:
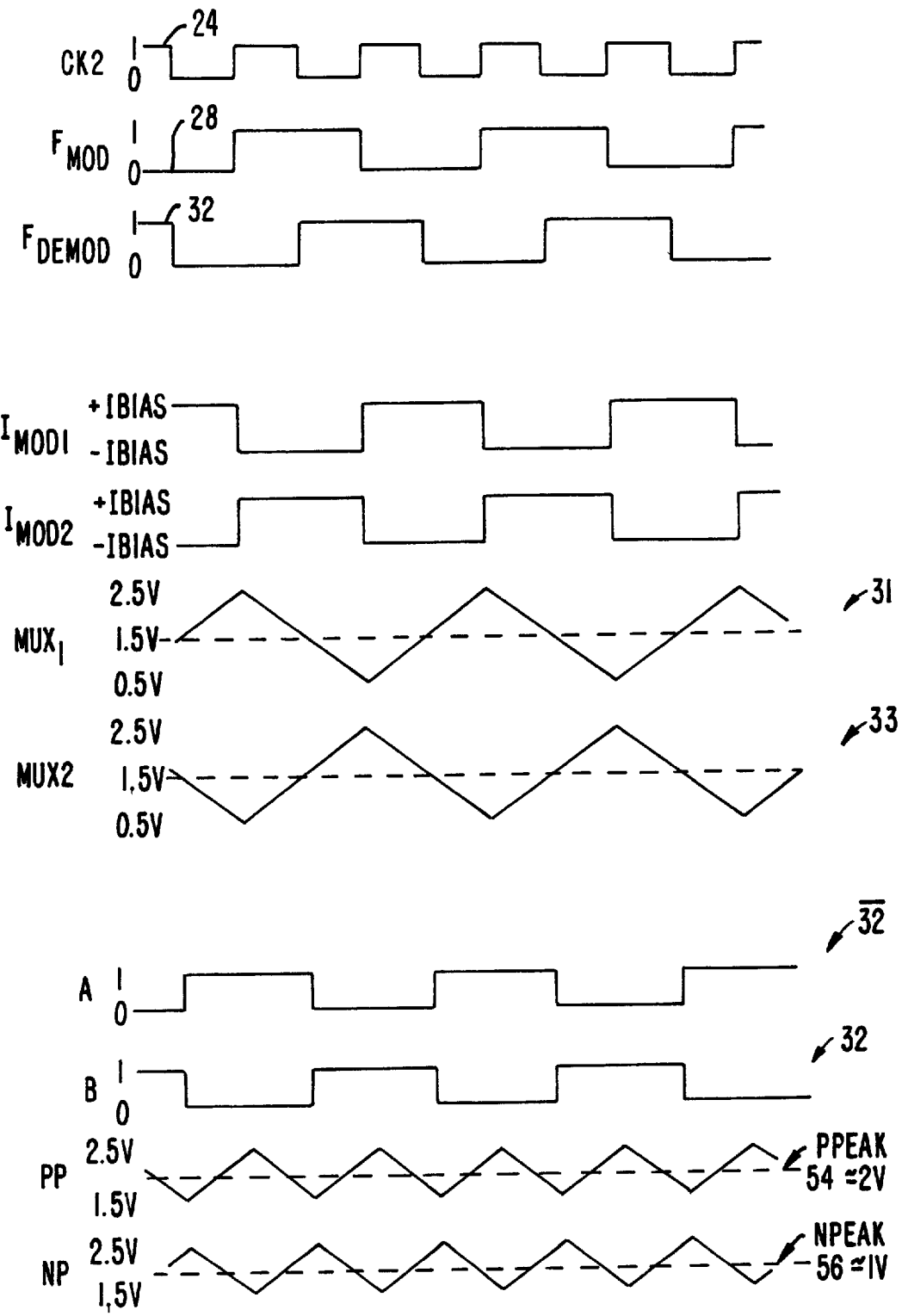
FIG. 4 is a timing diagram of various waveforms in the circuit of FIG. 3.

FIG. 3 is a block diagram of the electronics for driving touchpad 10, and FIG. 4 is an illustration of the waveforms of a number of the signals of FIG. 3. FIG. 3 shows touchpad 10 with its X and Y traces 14 and 16 connected to a two-channel analog multiplexer 50. The multiplexer is controlled by a microcontroller 22 which also provides a clock signal on line 24 to a frequency generator 26. The frequency generator provides the signals to a modulator 40 on line 28, and to a demodulator 52 on line 32. Modulator 40 drives the traces with a current, while demodulator 52 measures the resulting voltage on the same traces.

FIG. 3 shows an embodiment in which two lines are driven at the same time, but an alternate embodiment can drive a single line or more lines. In particular, signals MUX1 and MUX2 on lines 31 and 33 are coupled through multiplexer 50 to two different traces simultaneously.

FIG. 4 shows these signals as the current drive signals IMOD1 and IMOD2, which result in corresponding voltage signals labelled MUX1 and MUX2. The two signals are 1800 out of phase. This allows a differential measurement between the two traces, since the capacitive touch of a finger will decrease the amplitude of both signals 31 and 33, and thus driving them 1800 out of phase will provide a greater differential value which can be detected, providing more sensitivity. Alternately, a single IMOD1 and MUX1 could be used.

The demodulator 52 is driven by a signal 32 as shown in FIG. 4 which is 90° out of phase with signal 28 driving the modulator. This provides synchronous demodulation for signals MUX1 and MUX2 which are also approximately 90° out of phase with signal 28. The current source of the modulator and the trace capacitance are the integrating phase shifting circuit. At the bottom of FIG. 4, demodulator signals A and B illustrate the demodulation frequency signal 32 both in phase and out of phase for demodulating the two respective lines 31 and 33. The corresponding peak signals will provide a value with the triangular wave shifted, as indicated at the bottom of FIG. 4 as peak signals 54 and 56, shown by dotted lines (with the triangular waveform overlaid to illustrate the pre-demodulated signal).

Subtractor circuit 58 subtracts the two signals from each other to provide differential detection. This is then provided to a gain circuit 74, and combined with a calibration offset from DAC 80, which compensates for variations in trace capacitance, etc. The signal is then provided to a gain filter 84 and to an analog-to-digital converter 94.

In addition to the waveforms of FIG. 4, an additional waveform is generated to the active plane by a pulse signal 30 from frequency generator 26, through a active plane pulse generator 35, to produce a pulse signal 39 to active plane 20. In prior art systems, such a pulse signal would have been applied to an active stylus. Here, a non-active stylus 17 is used instead, with the pulses being provided to the active plane 20.

Figure 5:
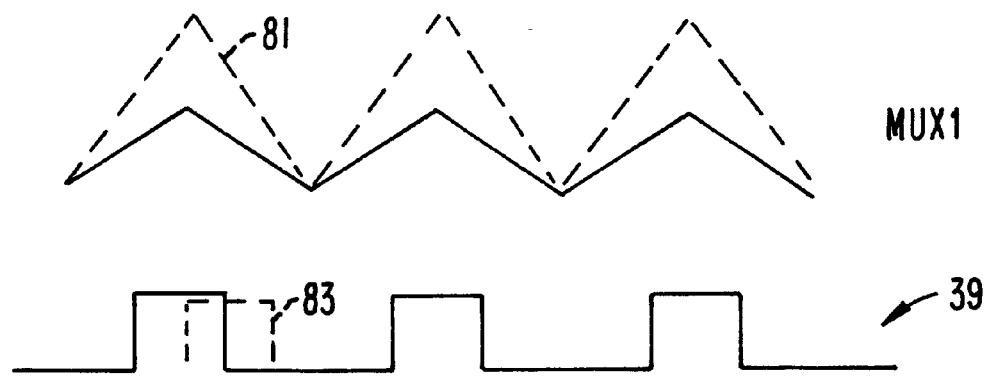
FIG. 5 is a timing diagram illustrating the effect on the triangular waveform of a detected touch, and possible modification of the active plane pulse.

FIG. 5 illustrates the pulse waveform 39 applied to the active plane, and also illustrates the detected voltage signal MUX1. A dotted line 81 illustrates the effect of a pen compressing the trace, giving a higher value, which is then detected by the demodulator 52. The amount of the peak of signal 81 can be controlled by controlling both the amplitude and phase of the pulses on waveform 39. The dotted line 83 illustrates how a phase shift could be applied to signal 39, which would reduce the peak of signal 81.

Figure 6:
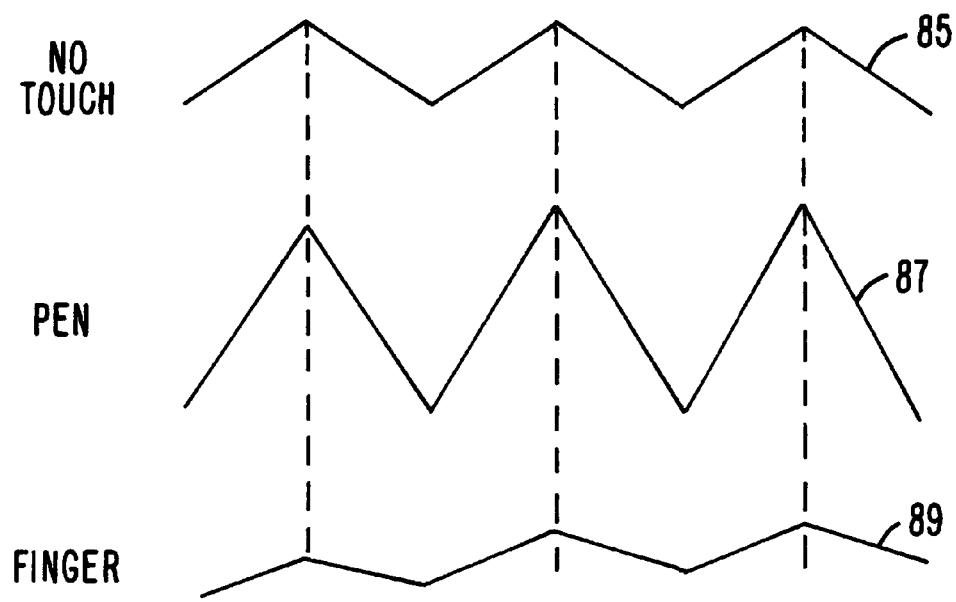
FIG. 6 is a timing diagram illustrating the difference between a stylus and a finger detection.

FIG. 6 illustrates the voltage waveform from a trace, such as MUX1, at three different times. A first waveform 85 shows the measurement when no touch is present. A second waveform 87 illustrates the touch of a pen or stylus which is not active, which will increase the voltage level. A final signal 89 illustrates the effect of a finger as capacitive coupling, which will reduce the voltage. By alternately reversing the polarity of the pulses on line 39, both the finger and the pen would reduce the peak waveform, producing a similar effect. In addition, by varying the phase and the amplitude of the active plane pulses, the amplitude of the effect of either a finger or a pen can be made similar. Preferably, the amplitude variation for both the pen and a finger is within the same amplitude range so that the same circuitry can be used to detect both.

In one embodiment, the finger and the stylus can be differentiated. This can be done by sequencing through all the traces in the method described above to detect a touch from either a finger or a stylus. If a touch is detected, the entire array can be resequenced without applying pulses to the active plane, instead grounding the active plane. If a touch is again sensed, this indicates that the touch is by a finger. If no touch is sensed, this will indicate that the touch was by a non-active stylus.

Alternately, the finger and the stylus can be differentiated by varying the amplitude and/or phase of the signal driving the active plane between two measurements, in any number of ways. The grounding of the active plane as discussed above is one example of varying the amplitude.

If a finger is pressed down on the touchpad, it will have both the capacitive effect of the finger without pressure, and some of the effect of a pen due to pressure. In one embodiment, an offsetting signal can be applied to the active plane to offset the pressure component of a finger. This would be useful, for example, because the pressure may cause a pen-like signal which offsets the capacitive touch signal from the finger, making detection difficult.

Alternately, the same physical touchpad could be programmed to be used either as a capacitive touch sensor for a finger using a grounded active plane, or using a driven active plane. The mode of operation could be dynamically varied as directed by software which could program the microcontroller 22.

As will be understood by those of skill in the art, the present invention may be embodied in other specific forms without departing from the spirit or essential characteristics thereof. For example, instead of a conductive sheet for the active plane, an array of traces could be used, with all the traces being driven at the same time with the pulse signal. Alternately, the "active plane" could be simply one or more adjacent traces which are provided the active plane signals. The pressure of a pen would cause the traces to spread and separate, or come closer depending on the location. The difference in spacing between the traces can then be detected. In addition, the active plane could be located above the X and Y traces, or in-between the X and Y traces. Accordingly, the foregoing description is intended to be illustrative, but not limiting, of the scope of the invention which is set forth in the following claims.

What is claimed is:

1. A method for sensing touch in a touch sensor having a plurality of traces and a conducting element, comprising the steps of:
   driving one of said traces with a first periodic waveform of a first frequency;
   driving said conducting element with a second periodic waveform of said first frequency; and
   sensing a third waveform on one of said traces to detect a variation in said waveform due to a touch varying a distance between at least one of said traces and said conducting element.

2. The method of claim 1 wherein said first waveform is a current waveform, and said third waveform is a voltage waveform.

3. The method of claim 2 wherein said current and said voltage waveforms are sensed on the same trace.

4. The method of claim 1 wherein said conducting element is a solid plane.

5. The method of claim 1 wherein said conducting element is an array of traces.

6. The method of claim 1 wherein said conducting element is at least one proximate trace.

7. The method of claim 1 wherein said first waveform is a triangular waveform, and said second waveform is a pulse waveform.

8. The method of claim 7 wherein said pulse waveform is a square wave.

9. The method of claim 1 wherein said steps are used to detect the touch of a stylus, and further comprising the steps of driving said conducting element with a DC voltage for capacitively detecting a finger.

10. The method of claim 9 wherein said DC voltage is ground.

11. The method of claim 9 further comprising the step of varying one of the phase and amplitude of said second waveform compared to said first waveform so that said third waveform is within a common amplitude range for detecting said stylus and said finger.

12. The method of claim 1 further comprising the step of varying at least one of the amplitude and phase of said second waveform to allow distinguishing between a finger and a stylus.

13. The method of claim 12 wherein said step of varying comprises:

alternately driving said conducting plane with a DC voltage for capacitively detecting a finger.

14. A method for sensing touch in a touch sensor having a plurality of traces and a conducting element, comprising the steps of:

driving one of said traces with a first waveform;

driving said conducting element with a second waveform;

sensing a third waveform on one of said traces to detect a variation in said first waveform due to a touch of a stylus varying a distance between at least one of said traces and said conducting element;

alternately driving said conducting element with a signal which varies one of the amplitude and phase of said second waveform for capacitively detecting a finger.

15. A method for sensing touch in a touch sensor having a plurality of traces and a conducting plane, comprising the steps of:

driving one of said traces with a first alternating triangular waveform of a first frequency;

driving said conducting plane with a second alternating pulse waveform of said first frequency;

sensing a third waveform on one of said traces to detect a variation in said first waveform due to a touch of a stylus compressing a distance between at least one of said traces and said conducting plane;

alternately driving said conducting plane with a DC voltage for capacitively detecting a finger; and varying one of the phase and amplitude of said second waveform so that said third waveform is within a common amplitude range for detecting said stylus and said finger.

16. A touch sensor comprising:

a plurality of traces;

a conducting element;

a compressible insulator between said traces and said conducting element;

a first driver alternately coupled to said traces for driving one of said traces with a first periodic waveform of a first frequency;

a second driver connected to said conducting plane for driving said conducting element with a second periodic waveform of said first frequency; and a sensing circuit alternately coupled to said traces for sensing a third waveform on one of said traces to detect a variation in said first waveform due to a touch varying a distance between at least one of said traces and said conducting element.

17. The sensor of claim 16 wherein said first waveform is a current waveform, and said third waveform is a voltage waveform.

18. The sensor of claim 17 wherein said current and said voltage waveforms are sensed on the same trace.

19. The sensor of claim 16 wherein said conducting element is a solid plane.

20. The sensor of claim 16 wherein said conducting element is an array of traces.

21. The sensor of claim 16 wherein said conducting element is at least one proximate trace.

22. The sensor of claim 16 wherein said first waveform is a triangular waveform, and said second waveform is a pulse waveform.

23. The sensor of claim 16 wherein said second driver is configured to vary at least one of the amplitude and phase of said second waveform to allow distinguishing between a finger and a stylus.

24. The sensor of claim 16 wherein said traces are above said conductive element.

25. The sensor of claim 16 wherein said traces are below said conductive element.

* * * * *